United States Patent
Yilmaz et al.

(10) Patent No.: US 12,547,256 B2
(45) Date of Patent: *Feb. 10, 2026

(54) EXECUTING GESTURES WITH ACTIVE STYLUS

(71) Applicant: Wacom Co., Ltd., Kazo (JP)

(72) Inventors: Esat Yilmaz, Santa Cruz, CA (US); Trond Jarle Pedersen, Trondheim (NO); John Logan, Danville, CA (US); Vemund Kval Bakken, Menlo Park, CA (US); Kishore Sundara-Rajan, San Jose, CA (US); Joo Yong Um, Gunpo-si (KR); Igor Polishchuk, Fremont, CA (US)

(73) Assignee: Wacom Co., Ltd., Kazo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 19/025,755

(22) Filed: Jan. 16, 2025

(65) Prior Publication Data

US 2025/0155996 A1 May 15, 2025

Related U.S. Application Data

(63) Continuation of application No. 18/473,765, filed on Sep. 25, 2023, now Pat. No. 12,236,020, which is a
(Continued)

(51) Int. Cl.
*G06F 3/0354* (2013.01)
*G06F 3/01* (2006.01)
(Continued)

(52) U.S. Cl.
CPC .......... *G06F 3/03545* (2013.01); *G06F 3/017* (2013.01); *G06F 3/0346* (2013.01);
(Continued)

(58) Field of Classification Search
CPC .... G06F 3/03545; G06F 3/017; G06F 3/0346; G06F 3/04162; G06F 3/0441;
(Continued)

(56) References Cited

U.S. PATENT DOCUMENTS

| 4,695,680 A | 9/1987 | Kable |
| 5,007,085 A | 4/1991 | Greanias et al. |

(Continued)

FOREIGN PATENT DOCUMENTS

WO WO 2012129247 A2 9/2012

OTHER PUBLICATIONS

Final Office Action for U.S. Appl. No. 13/363,190, Aug. 1, 2014.
(Continued)

*Primary Examiner* — Antonio Xavier
(74) *Attorney, Agent, or Firm* — Seed Intellectual Property Law Group LLP

(57) ABSTRACT

In one embodiment, a stylus comprising an accelerometer operable to detect an acceleration in response to a touch to the body and initiate a pre-determined function, a method of using same, and one or more non-transitory computer-readable storage media embodying logic.

16 Claims, 9 Drawing Sheets

Related U.S. Application Data continuation of application No. 18/055,224, filed on Nov. 14, 2022, now Pat. No. 11,868,548, which is a continuation of application No. 17/591,388, filed on Feb. 2, 2022, now Pat. No. 11,520,419, which is a continuation of application No. 16/825,686, filed on Mar. 20, 2020, now Pat. No. 11,269,429, which is a continuation of application No. 14/832,049, filed on Aug. 21, 2015, now Pat. No. 10,599,234, which is a continuation of application No. 13/419,087, filed on Mar. 13, 2012, now Pat. No. 9,116,558.

(60) Provisional application No. 61/553,114, filed on Oct. 28, 2011.

(51) Int. Cl.
 G06F 3/0346 (2013.01)
 G06F 3/041 (2006.01)
 G06F 3/044 (2006.01)
 G06F 3/046 (2006.01)
 G06F 3/04883 (2022.01)

(52) U.S. Cl.
 CPC ........ G06F 3/04162 (2019.05); G06F 3/0441 (2019.05); G06F 3/0442 (2019.05); G06F 3/046 (2013.01); G06F 3/04883 (2013.01); G06F 3/04164 (2019.05); G06F 2203/0381 (2013.01); G06F 2203/0384 (2013.01); G06F 2203/04104 (2013.01); G06F 2203/04106 (2013.01); G06F 2203/04808 (2013.01)

(58) Field of Classification Search
 CPC .... G06F 3/0442; G06F 3/046; G06F 3/04883; G06F 3/04164; G06F 2203/0381; G06F 2203/0384; G06F 2203/04104; G06F 2203/04106; G06F 2203/04808
 See application file for complete search history.

(56) References Cited

U.S. PATENT DOCUMENTS

| | | |
|---|---|---|
| 5,349,139 A | 9/1994 | Verrier et al. |
| 5,453,762 A | 9/1995 | Ito et al. |
| 5,478,976 A | 12/1995 | Kano |
| 5,557,076 A | 9/1996 | Wieczorek et al. |
| 5,612,720 A | 3/1997 | Ito et al. |
| 5,699,084 A | 12/1997 | Fukuzaki |
| 5,883,338 A | 3/1999 | Trunck et al. |
| 5,973,677 A | 10/1999 | Gibbons |
| 6,195,446 B1 | 2/2001 | Skoog |
| 6,249,276 B1 | 6/2001 | Ohno |
| 6,268,857 B1 | 7/2001 | Fishkin et al. |
| 6,556,694 B2 | 4/2003 | Skoog |
| 6,728,881 B1 | 4/2004 | Karamchetty |
| 6,798,907 B1 | 9/2004 | Clary et al. |
| 7,098,896 B2 | 8/2006 | Kushler et al. |
| 7,425,643 B1 | 9/2008 | Jen et al. |
| 7,426,643 B2 | 9/2008 | Homer et al. |
| 7,612,767 B1 | 11/2009 | Griffin et al. |
| 7,663,509 B2 | 2/2010 | Shen |
| 7,663,607 B2 | 2/2010 | Hotelling et al. |
| 7,864,503 B2 | 1/2011 | Chang |
| 7,875,814 B2 | 1/2011 | Chen et al. |
| 7,920,129 B2 | 4/2011 | Hotelling et al. |
| 8,031,094 B2 | 10/2011 | Hotelling et al. |
| 8,031,174 B2 | 10/2011 | Hamblin et al. |
| 8,040,326 B2 | 10/2011 | Hotelling et al. |
| 8,049,732 B2 | 11/2011 | Hotelling et al. |
| 8,179,381 B2 | 5/2012 | Frey et al. |
| 8,217,902 B2 | 7/2012 | Chang et al. |
| 8,638,320 B2 | 1/2014 | Harley et al. |
| 8,723,824 B2 | 5/2014 | Myers et al. |
| 9,116,558 B2 | 8/2015 | Yilmaz et al. |
| 9,164,603 B2 | 10/2015 | Pedersen et al. |
| 9,880,645 B2 | 1/2018 | Pedersen et al. |
| 10,599,234 B2 | 3/2020 | Yilmaz et al. |
| 11,520,419 B2 | 12/2022 | Yilmaz et al. |
| 2002/0175903 A1 | 11/2002 | Fahraeus et al. |
| 2002/0190947 A1 | 12/2002 | Feinstein |
| 2003/0095115 A1 | 5/2003 | Brian et al. |
| 2004/0039602 A1 | 2/2004 | Greenberg et al. |
| 2004/0047671 A1 | 3/2004 | Su |
| 2004/0140965 A1 | 7/2004 | Wang et al. |
| 2005/0063570 A1 | 3/2005 | Kim |
| 2005/0110778 A1 | 5/2005 | Ben Ayed |
| 2006/0023922 A1 | 2/2006 | Black |
| 2006/0267966 A1 | 11/2006 | Grossman et al. |
| 2007/0005849 A1 | 1/2007 | Oliver |
| 2007/0057763 A1 | 3/2007 | Blattner et al. |
| 2007/0176906 A1 | 8/2007 | Warren |
| 2007/0220018 A1 | 9/2007 | Phillips et al. |
| 2007/0285405 A1 | 12/2007 | Rehm |
| 2008/0074391 A1 | 3/2008 | Coe |
| 2008/0106523 A1 | 5/2008 | Conrad |
| 2008/0143693 A1 | 6/2008 | Schena |
| 2008/0158170 A1 | 7/2008 | Herz et al. |
| 2008/0238885 A1 | 10/2008 | Zachut et al. |
| 2008/0309621 A1 | 12/2008 | Aggarwal et al. |
| 2008/0309635 A1 | 12/2008 | Matsuo |
| 2009/0073144 A1 | 3/2009 | Chen et al. |
| 2009/0095540 A1 | 4/2009 | Zachut et al. |
| 2009/0115725 A1 | 5/2009 | Shemesh et al. |
| 2009/0127005 A1 | 5/2009 | Zachut et al. |
| 2009/0153152 A1 | 6/2009 | Maharyta et al. |
| 2009/0184939 A1 | 7/2009 | Wohlstadter et al. |
| 2009/0219250 A1 | 9/2009 | Ure |
| 2009/0251434 A1 | 10/2009 | Rimon et al. |
| 2009/0259432 A1 | 10/2009 | Liberty et al. |
| 2009/0315854 A1 | 12/2009 | Matsuo |
| 2010/0006350 A1 | 1/2010 | Elias |
| 2010/0066687 A1 | 3/2010 | Soto et al. |
| 2010/0079414 A1 | 4/2010 | Ferlitsch |
| 2010/0155153 A1 | 6/2010 | Zachut |
| 2010/0279738 A1 | 11/2010 | Kim et al. |
| 2010/0292945 A1 | 11/2010 | Reynolds et al. |
| 2010/0308962 A1 | 12/2010 | Li |
| 2010/0315384 A1 | 12/2010 | Hargreaves et al. |
| 2011/0007029 A1 | 1/2011 | Ben-David |
| 2011/0071394 A1 | 3/2011 | Fedinec |
| 2011/0227825 A1 | 9/2011 | Liberty et al. |
| 2012/0068963 A1 | 3/2012 | Esenther et al. |
| 2012/0068964 A1 | 3/2012 | Wright et al. |
| 2012/0127110 A1 | 5/2012 | Amm et al. |
| 2012/0179547 A1 | 7/2012 | Besore et al. |
| 2012/0206330 A1* | 8/2012 | Cao ............ G06F 3/0346 345/156 |
| 2012/0242588 A1 | 9/2012 | Myers et al. |
| 2012/0242592 A1 | 9/2012 | Rothkopf et al. |
| 2012/0242603 A1 | 9/2012 | Engelhardt et al. |
| 2012/0243151 A1 | 9/2012 | Lynch |
| 2012/0243719 A1 | 9/2012 | Franklin et al. |
| 2012/0309376 A1 | 12/2012 | Huang et al. |
| 2012/0327041 A1 | 12/2012 | Harley et al. |
| 2012/0327042 A1 | 12/2012 | Harley et al. |
| 2012/0331546 A1 | 12/2012 | Falkenburg et al. |
| 2013/0009907 A1 | 1/2013 | Rosenberg et al. |
| 2013/0076612 A1 | 3/2013 | Myers |
| 2013/0106724 A1 | 5/2013 | Pedersen et al. |
| 2013/0106799 A1 | 5/2013 | Yilmaz et al. |
| 2013/0106800 A1 | 5/2013 | Yilmaz et al. |
| 2013/0120281 A1 | 5/2013 | Harris |
| 2013/0120463 A1 | 5/2013 | Harris |
| 2013/0257777 A1 | 10/2013 | Benko et al. |
| 2014/0086460 A1 | 3/2014 | Bechtel |
| 2014/0196106 A1 | 7/2014 | Zellner |

(56) References Cited

U.S. PATENT DOCUMENTS

2014/0344682 A1  11/2014  Seyller et al.
2016/0091993 A1  3/2016   Pedersen et al.

OTHER PUBLICATIONS

Final Office Action for U.S. Appl. No. 13/419,087, Aug. 22, 2014.
Final Office Action for U.S. Appl. No. 13/419,087, Dec. 31, 2014.
Final Office Action for U.S. Appl. No. 13/419,087, Sep. 4, 2012.
Final Office Action for U.S. Appl. No. 13/556,766, Aug. 26, 2013.
Final Office Action for U.S. Appl. No. 13/556,799, Mar. 22, 2013.
Kyung et al., "wUbi-Pen: Windows Graphical User Interface Interacting with Haptic Feedback Stylus," *SIGGRAPH*, Los Angeles, California, Aug. 11-15, 2008. (4 pages).
Lee et al., "Haptic Pen: A Tactile Feedback Stylus for Touch Screens," Mitsubishi Electric Research Laboratories, Oct. 2004. (5 pages).
Lynch, "Electronic Devices With Convex Displays," U.S. Appl. No. 61/454,950, filed Mar. 21, 2011. (18 pages).
Myers et al., "Electronic Devices With Concave Displays," U.S. Appl. No. 61/454,936, filed Mar. 21, 2011. (16 pages).
Non-Final Office Action for U.S. Appl. No. 13/363,190, Jan. 31, 2014.
Non-Final Office Action for U.S. Appl. No. 13/419,087, Apr. 25, 2014.
Non-Final Office Action for U.S. Appl. No. 13/419,087, May 16, 2012.
Non-Final Office Action for U.S. Appl. No. 13/556,766, Aug. 8, 2014.
Non-Final Office Action for U.S. Appl. No. 13/556,766, Jan. 30, 2013.
Non-Final Office Action for U.S. Appl. No. 13/556,799, Jul. 30, 2014.
Non-Final Office Action for U.S. Appl. No. 13/556,799, Sep. 27, 2012.
Notice of Allowance for U.S. Appl. No. 13/419,087, Apr. 23, 2014.
RCE and Amendment for U.S. Appl. No. 13/419,087, Jan. 4, 2013.
RCE and Amendment for U.S. Appl. No. 13/419,087, Nov. 24, 2014.
Response to Non-Final Office Action for U.S. Appl. No. 13/419,087, Aug. 16, 2012.
Response to Non-Final Office Action for U.S. Appl. No. 13/419,087, Jul. 25, 2014.
Response to Non-Final Office Action for U.S. Appl. No. 13/419,087, Mar. 31, 2015.
Rothkopf et al., "Electronic Devices With Flexible Displays," U.S. Appl. No. 61/454,894, filed Mar. 21, 2011. (25 pages).
Song et al., "Grips and Gestures on a Multi-Touch Pen," *CHI Session: Flexible Grips & Gestures,* Vancouver, BC, Canada, May 7-12, 2011. (10 pages).
Tan et al., "Application of Capacitive Coupling to the Design of an Absolute-Coordinate Pointing Device," *IEEE Transactions on Instrumentation and Measurement* 54(5): 2099-2104, Oct. 2005.

\* cited by examiner

EXECUTING GESTURES WITH ACTIVE STYLUS

RELATED APPLICATION

This application is a continuation, under U.S.C. § 120, of U.S. patent application Ser. No. 18/473,765, filed Sep. 25, 2023, which is a continuation of U.S. patent application Ser. No. 18/055,224, filed Nov. 14, 2022, which issued as U.S. Pat. No. 11,868,548, which is a continuation of U.S. patent application Ser. No. 17/591,388, filed Feb. 2, 2022, which issued as U.S. Pat. No. 11,520,419, which is a continuation of U.S. patent application Ser. No. 16/825,686, filed Mar. 20, 2020, which issued as U.S. Pat. No. 11,269,429, which is a continuation of U.S. patent application Ser. No. 14/832,049, filed Aug. 21, 2015, which issued as U.S. Pat. No. 10,599,234, which is a continuation of U.S. patent application Ser. No. 13/419,087, filed Mar. 13, 2012, which issued as U.S. Pat. No. 9,116,558, which claims the benefit, under 35 U.S.C. § 119(e), of U.S. Provisional Patent Application No. 61/553,114, filed Oct. 28, 2011, which are incorporated herein by reference.

BACKGROUND

Technical Field

This disclosure generally relates to active styluses.

Description of the Related Art

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as, for example, resistive touch screens, surface acoustic wave touch screens, and capacitive touch screens. Herein, reference to a touch sensor may encompass a touch screen, and vice versa, where appropriate. When an object touches or comes within proximity of the surface of the capacitive touch screen, a change in capacitance may occur within the touch screen at the location of the touch or proximity. A touch-sensor controller may process the change in capacitance to determine its position on the touch screen.

BRIEF SUMMARY

One or more embodiments are directed to a stylus comprising a body, a pen tip, and an accelerometer on the body and operable to detect an acceleration in response to a touch to the body. The stylus further includes a controller operable, in response to detecting the acceleration, to cause a signal to be transmitted to a device to initiate a pre-determined function to be performed by the stylus or the device.

The touch may be from a user holding the body and tapping a side of the body, and the tapping causes the acceleration that is detected by the accelerometer. The user may tap the side of the body using a finger of the user. The pre-determined function may comprise sending a downlink signal to a controller of the device or authenticating the user associated with the stylus. The pre-determined function is executed by the device and is initiated with a combination of interactions of the stylus. The stylus may further include a gyroscope.

One or more embodiments is directed to a method comprising detecting, by an accelerometer in a stylus, an acceleration, and in response to detecting the acceleration, transmitting a signal to a device to initiate a pre-determined function, wherein the pre-determined function is performed by the stylus or the device. The acceleration may be generated in response a user holding and tapping the stylus.

One or more embodiments are directed to one or more non-transitory computer-readable storage media embodying logic that is operable when executed to determine an acceleration is detected by an accelerometer of the stylus; and initiate a pre-determined function of the stylus or a device in response to determining the acceleration is detected by the accelerometer.

DETAILED DESCRIPTION

Figure 1:
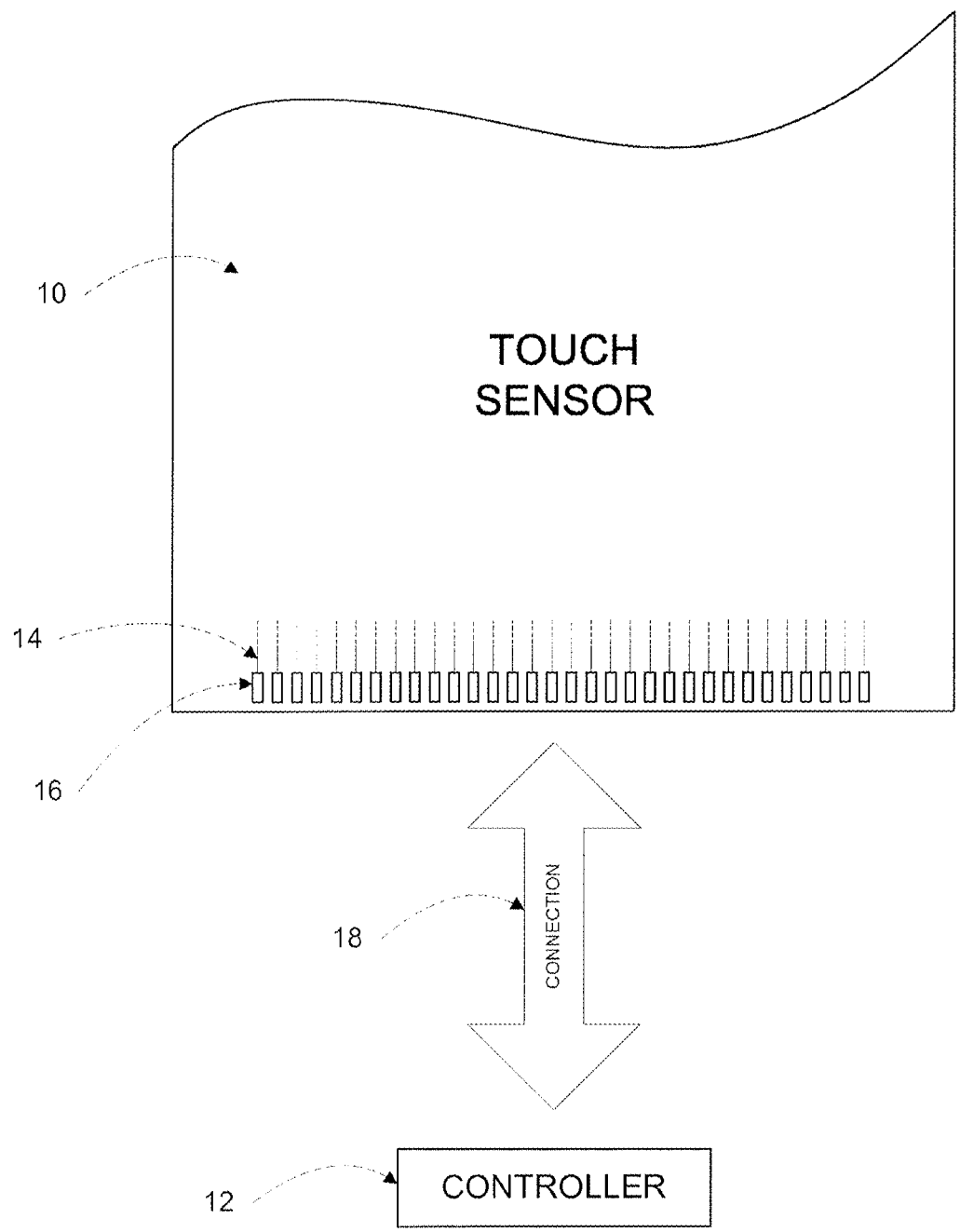
FIG. 1 illustrates an example touch sensor with an example touch-sensor controller.

FIG. 1 illustrates an example touch sensor 10 with an example touch-sensor controller 12. Touch sensor 10 and touch-sensor controller 12 may detect the presence and location of a touch or the proximity of an object within a touch-sensitive area of touch sensor 10. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 10 may include one or more touch-sensitive areas, where appropriate. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a ground electrode, guard electrode, drive electrode, or sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as a 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 5% of the area of its shape in a hatched, mesh, or other suitable pattern. Herein, reference to FLM encompasses such material, where appropriate. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns.

Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and touch-sensor controller 12. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 μm or less and a width of approximately 10 μm or less. As another example, one or more portions of the conductive material may be silver or silver-based and similarly have a thickness of approximately 5 μm or less and a width of approximately 10 μm or less. This disclosure contemplates any suitable electrodes made of any suitable material.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and controller 12 may measure the change in capacitance, for example, as a change in the amount of charge needed to raise the voltage at the capacitive node by a pre-determined amount. As with a mutual-capacitance implementation, by measuring changes in capacitance throughout the array, controller 12 may determine the position of the touch or proximity within the touch-sensitive area(s) of touch sensor 10. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other-instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such one or more central processing units (CPUs)) of a device that includes touch sensor 10 and touch-sensor controller 12, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices (PLDs) or programmable logic arrays (PLAs), application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. The FPC may be active or passive, where appropriate. In particular embodiments multiple touch-sensor controllers 12 are disposed on the FPC. Touch-sensor controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g., at the edges of) the touch-sensitive area(s) of touch sensor 10. Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 µm or less. As another example, the conductive material of tracks 14 may be silver or silver-based and have a width of approximately 100 µm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between touch-sensor controller 12 and touch sensor 10.

Figure 2:
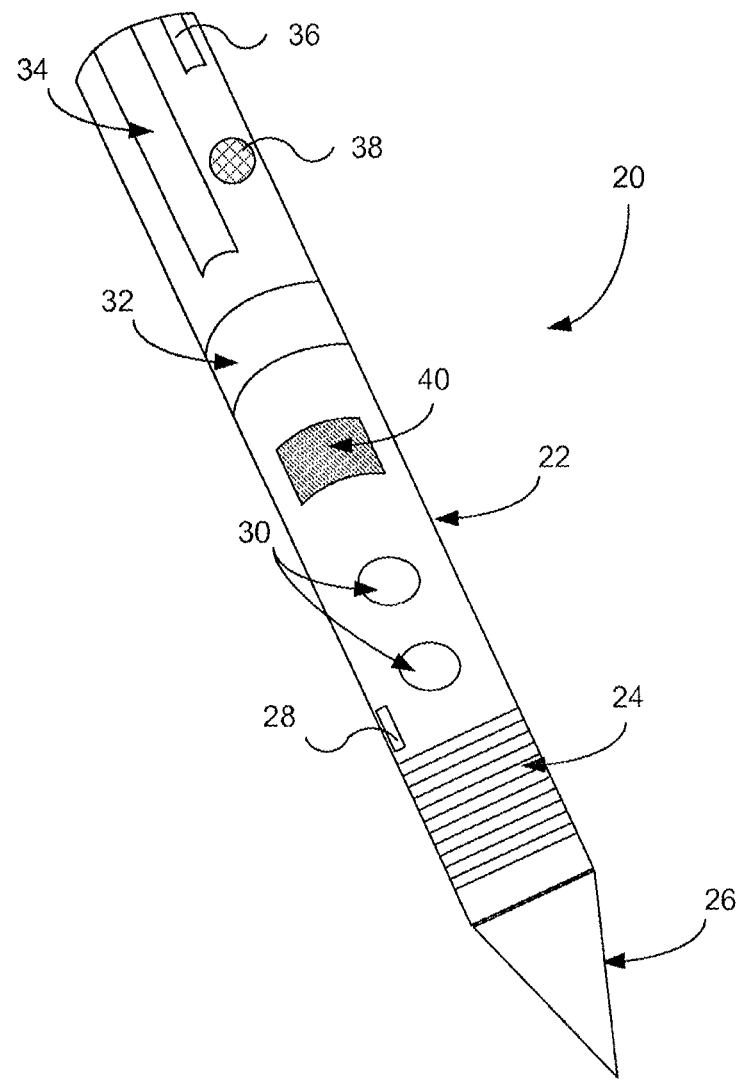
FIG. 2 illustrates an example active stylus exterior.

FIG. 2 illustrates an example exterior of an example active stylus 20. Active stylus 20 may include one or more components, such as buttons 30 or sliders 32 and 34 integrated with an outer body 22. These external components may provide for interaction between active stylus 20 and a user or between a device and a user. As an example and not by way of limitation, interactions may include communication between active stylus 20 and a device, enabling or altering functionality of active stylus 20 or a device, or providing feedback to or accepting input from one or more users. The device may be any suitable device, such as, for example and without limitation, a desktop computer, laptop computer, tablet computer, personal digital assistant (PDA), smartphone, satellite navigation device, portable media player, portable game console, kiosk computer, point-of-sale device, or other suitable device. Although this disclosure provides specific examples of particular components configured to provide particular interactions, this disclosure contemplates any suitable component configured to provide any suitable interaction. Active stylus 20 may have any suitable dimensions with outer body 22 made of any suitable material or combination of materials, such as, for example and without limitation, plastic or metal. In particular embodiments, exterior components (e.g., 30 or 32) of active stylus 20 may interact with internal components or programming of active stylus 20 or may initiate one or more interactions with one or more devices or other active styluses 20.

As described above, actuating one or more particular components may initiate an interaction between active stylus 20 and a user or between the device and the user. Components of active stylus 20 may include one or more buttons 30 or one or more sliders 32 and 34. As an example and not by way of limitation, buttons 30 or sliders 32 and 34 may be mechanical or capacitive and may function as a roller, trackball, or wheel. As another example, one or more sliders 32 or 34 may function as a vertical slider 34 aligned along a longitudinal axis, while one or more wheel sliders 32 may be aligned along the circumference of active stylus 20. In particular embodiments, capacitive sliders 32 and 34 or buttons 30 may be implemented using one or more touch-sensitive areas. Touch-sensitive areas may have any suitable shape, dimensions, location, or be made from any suitable material. As an example and not by way of limitation, sliders 32 and 34 or buttons 30 may be implemented using areas of flexible mesh formed using lines of conductive material. As another example, sliders 32 and 34 or buttons 30 may be implemented using a FPC.

Active stylus 20 may have one or more components configured to provide feedback to or accepting feedback from a user, such as, for example and without limitation, tactile, visual, or audio feedback. Active stylus 20 may include one or more ridges or grooves on its outer body 22. Ridges or grooves 24 may have any suitable dimensions, have any suitable spacing between ridges or grooves, or be located at any suitable area on outer body 22 of active stylus 20. As an example and not by way of limitation, ridges 24 may enhance a user's grip on outer body 22 of active stylus 20 or provide tactile feedback to or accept tactile input from a user. Active stylus 20 may include one or more audio components 38 capable of transmitting and receiving audio signals. As an example and not by way of limitation, audio component 38 may contain a microphone capable of recording or transmitting one or more users' voices. As another example, audio component 38 may provide an auditory indication of a power status of active stylus 20. Active stylus 20 may include one or more visual feedback components 36, such as a light-emitting diode (LED) indicator. As an example and not by way of limitation, visual feedback component 36 may indicate a power status of active stylus 20 to the user.

One or more modified surface areas 40 may form one or more components on outer body 22 of active stylus 20. Properties of modified surface areas 40 may be different than properties of the remaining surface of outer body 22. As an example and not by way of limitation, modified surface area 40 may be modified to have a different texture, temperature, or electromagnetic characteristic relative to the surface properties of the remainder of outer body 22. Modified surface area 40 may be capable of dynamically altering its properties, for example by using haptic interfaces or rendering techniques. A user may interact with modified surface area 40 to provide any suitable functionally. For example and not by way of limitation, dragging a finger across modified surface area 40 may initiate an interaction, such as data transfer, between active stylus 20 and a device.

One or more components of active stylus 20 may be configured to communicate data between active stylus 20 and the device. For example, active stylus 20 may include one or more tips 26 or nibs. Tip 26 may include one or more electrodes configured to communicate data between active stylus 20 and one or more devices or other active styluses. Tip 26 may be made of any suitable material, such as a conductive material, and have any suitable dimensions, such as, for example, a diameter of 1 mm or less at its terminal end. Active stylus 20 may include one or more ports 28 located at any suitable location on outer body 22 of active stylus 20. Port 28 may be configured to transfer signals or information between active stylus 20 and one or more devices or power sources. Port 28 may transfer signals or information by any suitable technology, such as, for example, by universal serial bus (USB) or Ethernet connections. Although this disclosure describes and illustrates a particular configuration of particular components with particular locations, dimensions, composition and functionality, this disclosure contemplates any suitable configuration of suitable components with any suitable locations, dimensions, composition, and functionality with respect to active stylus 20.

Figure 3:
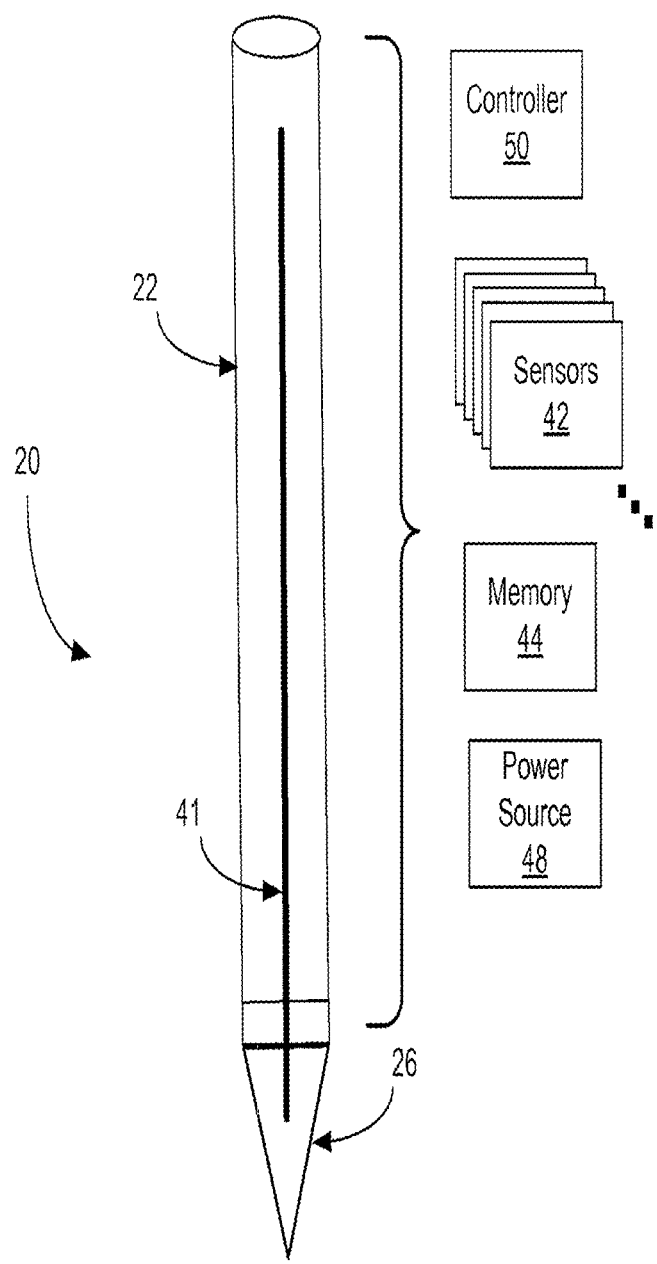
FIG. 3 illustrates an example active stylus interior.

FIG. 3 illustrates example internal components of an example active stylus 20. Active stylus 20 may include one or more internal components, such as a controller 50, sensors 42, memory 44, or power source 48. In particular embodiments, one or more internal components may be configured to provide for interaction between active stylus 20 and a user or between a device and a user. In other particular embodiments, one or more internal components, in conjunction with one or more external components described above, may be configured to provide interaction between active stylus 20 and a user or between a device and a user. As an example and not by way of limitation, interactions may include communication between active stylus 20 and a device, enabling or altering functionality of active stylus 20 or a device, or providing feedback to or accepting input from one or more users.

Controller 50 may be a microcontroller or any other type of processor suitable for controlling the operation of active stylus 20. Controller 50 may be one or more ICs such as, for example, general-purpose microprocessors, microcontrollers, PLDs, PLAs, or ASICs. Controller 50 may include a processor unit, a drive unit, a sense unit, and a storage unit. The drive unit may supply signals to electrodes of tip 26 through center shaft 41. The drive unit may also supply signals to control or drive sensors 42 or one or more external components of active stylus 20. The sense unit may sense signals received by electrodes of tip 26 through center shaft 41 and provide measurement signals to the processor unit representing input from a device. The sense unit may also sense signals generated by sensors 42 or one or more external components and provide measurement signals to the processor unit representing input from a user. The processor unit may control the supply of signals to the electrodes of tip 26 and process measurement signals from the sense unit to detect and process input from the device. The processor unit may also process measurement signals from sensors 42 or one or more external components. The storage unit may store programming for execution by the processor unit, including programming for controlling the drive unit to supply signals to the electrodes of tip 26, programming for processing measurement signals from the sense unit corresponding to input from the device, programming for processing measurement signals from sensors 42 or external components to initiate a pre-determined function or gesture to be performed by active stylus 20 or the device, and other suitable programming, where appropriate. As an example and not by way of limitation, programming executed by controller 50 may electronically filter signals received from the sense unit. Although this disclosure describes a particular controller 50 having a particular implementation with particular components, this disclosure contemplates any suitable controller having any suitable implementation with any suitable components.

In particular embodiments, active stylus 20 may include one or more sensors 42, such as touch sensors, gyroscopes, accelerometers, contact sensors, force sensors, pressure sensors, or any other type of sensor that detect or measure data about the environment in which active stylus 20 operates. Sensors 42 may detect and measure one or more characteristic of active stylus 20, such as acceleration or movement, orientation, contact, pressure on outer body 22, force on tip 26, vibration, or any other suitable characteristic of active stylus 20. As an example and not by way of limitation, sensors 42 may be implemented mechanically, electronically, or capacitively. As described above, data detected or measured by sensors 42 communicated to controller 50 may initiate a pre-determined function or gesture to be performed by active stylus 20 or the device. In particular embodiments, data detected or received by sensors 42 may be stored in memory 44. Memory 44 may be any form of memory suitable for storing data in active stylus 20. In other particular embodiments, controller 50 may access data stored in memory 44. As an example and not by way of limitation, memory 44 may store programming for execution by the processor unit of controller 50. As another example, data measured by sensors 42 may be processed by controller 50 and stored in memory 44.

Power source 48 may be any type of stored-energy source, including electrical or chemical-energy sources, suitable for powering the operation of active stylus 20. In particular embodiments, power source 48 may be charged by energy from a user or device. As an example and not by way of limitation, power source 48 may be a rechargeable battery that may be charged by motion induced on active stylus 20. In other particular embodiments, power source 48 of active stylus 20 may provide power to or receive power from the device. As an example and not by way of limitation, power may be inductively transferred between power source 48 and a power source of the device.

Figure 4:
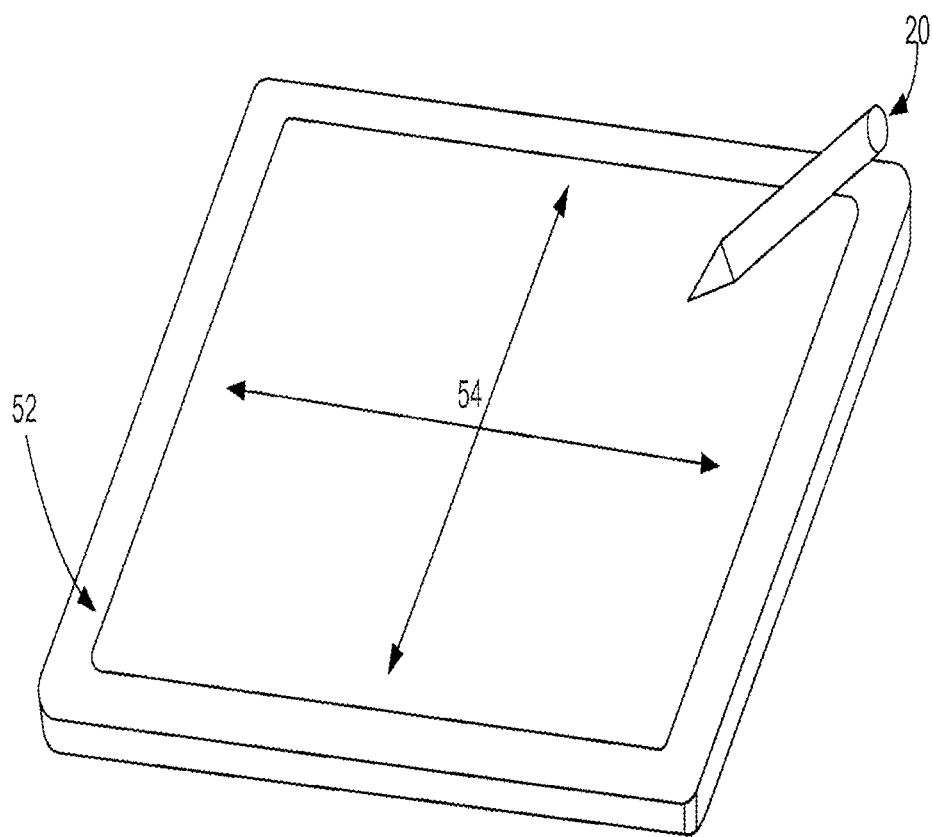
FIG. 4 illustrates an example active stylus with touch sensor device.

FIG. 4 illustrates an example active stylus 20 with an example device 52. Device 52 may have a display (not shown) and a touch sensor with a touch-sensitive area 54. Device 52 display may be a liquid crystal display (LCD), a LED display, a LED-backlight LCD, or other suitable display and may be visible though a cover panel and substrate (and the drive and sense electrodes of the touch sensor disposed on it) of device 52. Although this disclosure describes a particular device display and particular display types, this disclosure contemplates any suitable device display and any suitable display types.

Device 52 electronics may provide the functionality of device 52. As example and not by way of limitation, device 52 electronics may include circuitry or other electronics for wireless communication to or from device 52, execute programming on device 52, generating graphical or other user interfaces (UIs) for device 52 display to display to a user, managing power to device 52 from a battery or other power source, taking still pictures, recording video, other suitable functionality, or any suitable combination of these. Although this disclosure describes particular device electronics providing particular functionality of a particular device, this disclosure contemplates any suitable device electronics providing any suitable functionality of any suitable device.

In particular embodiments, active stylus 20 and device 52 may be synchronized prior to communication of data between active stylus 20 and device 52. As an example and not by way of limitation, active stylus 20 may be synchronized to device through a pre-determined bit sequence transmitted by the touch sensor of device 52. As another example, active stylus 20 may be synchronized to device by processing the drive signal transmitted by drive electrodes of the touch sensor of device 52. Active stylus 20 may interact or communicate with device 52 when active stylus 20 is brought in contact with or in proximity to touch-sensitive area 54 of the touch sensor of device 52. In particular embodiments, interaction between active stylus 20 and device 52 may be capacitive or inductive. As an example and not by way of limitation, when active stylus 20 is brought in contact with or in the proximity of touch-sensitive area 54 of device 52, signals generated by active stylus 20 may influence capacitive nodes of touch-sensitive area of device 52 or vice versa. As another example, a power source of active stylus 20 may be inductively charged through the touch sensor of device 52, or vice versa. Although this disclosure describes particular interactions and communications between active stylus 20 and device 52, this disclosure contemplates any suitable interactions and communications through any suitable means, such as mechanical forces, current, voltage, or electromagnetic fields.

In particular embodiments, measurement signal from the sensors of active stylus 20 may initiate, provide for, or terminate interactions between active stylus 20 and one or more devices 52 or one or more users, as described above. Interaction between active stylus 20 and device 52 may occur when active stylus 20 is contacting or in proximity to device 52. As an example and not by way of limitation, a user may perform a gesture or sequence of gestures, such as shaking or inverting active stylus 20, whilst active stylus 20 is hovering above touch-sensitive area 54 of device 52. Active stylus may interact with device 52 based on the gesture performed with active stylus 20 to initiate a predetermined function, such as authenticating a user associated with active stylus 20 or device 52. Although this disclosure describes particular movements providing particular types of interactions between active stylus 20 and device 52, this disclosure contemplates any suitable movement influencing any suitable interaction in any suitable way.

Figure 5:
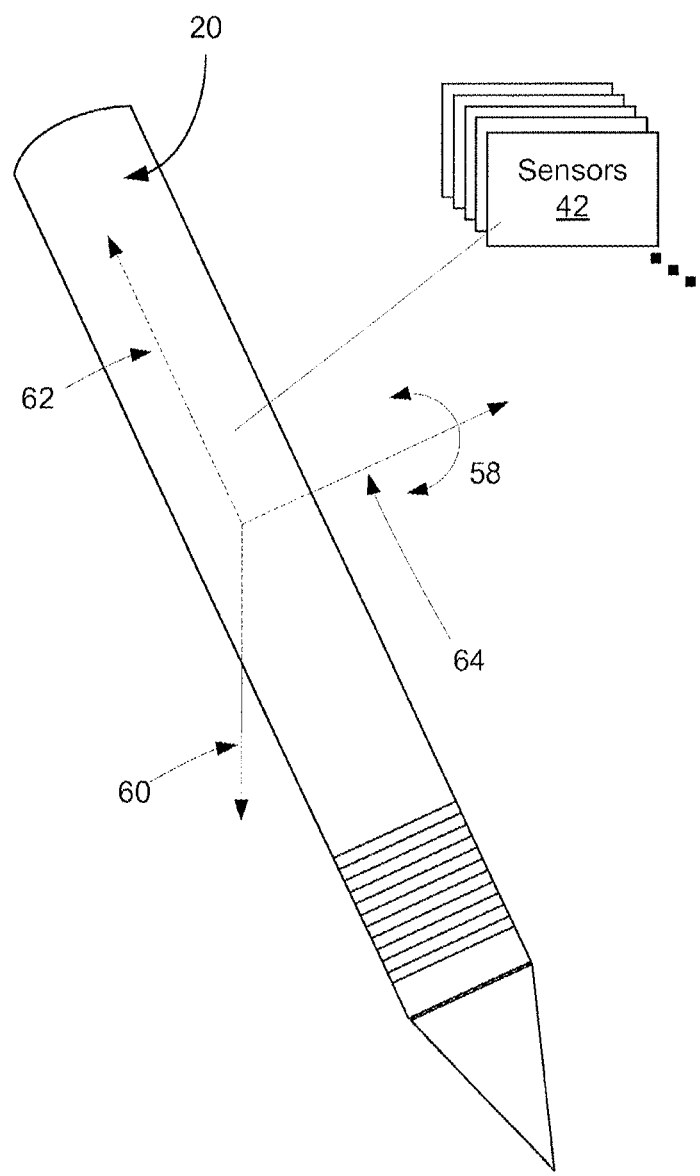
FIG. 5 illustrates an example active stylus capable of executing gestures.

FIG. 5 illustrates an example active stylus capable of executing gestures. A gesture may involve a movement, such as translation in any suitable direction or rotation about any suitable axis, or any suitable combination of translations and rotations. As an example, active stylus 20 rotates 58 about axis 60, 62, or 64. As another example, active stylus 20 moves translationally in any direction, such as along axis 60, 62, or 64. Gestures may be performed on active stylus 20. As an example, tapping active stylus 20 or sliding an object across active stylus 20 constitutes a gesture or part of a gesture. A portion of active stylus 20 may be textured so that sliding one object across the body of active stylus 20 may be classified as a different gesture than sliding a different object. As an example, a portion of active stylus 20 may have ridges, and sliding a finger across these ridges may be classified as a different gesture than sliding a fingernail across the same ridges. While this disclosure provides specific examples of motion with or on an active stylus constituting a gesture or part of a gesture, this disclosure contemplates any suitable motion with or on an active stylus constituting any suitable gesture or part of a gesture.

In particular embodiments, a gesture may provide input, such as electromagnetic input, to or be electronically recorded by components in active stylus 20. More specifically, in some implementations, a specific gesture may be translated into a specific electromagnetic input, and different gestures may be respectively translated into different electromagnetic inputs. As an example, electromagnetic input may be provided by one or more sensors 42 placed at any suitable locations in or on active stylus 20. As an example of sensors 42, one or more accelerometers sense translation, motion, and vibration of active stylus 20. As another example, one or more gyroscopes sense rotation of active stylus 20. As another example, one or more force sensors sense force from one or more locations on active stylus 20, such as the tip or along a portion of the body. As another example, one or more magnetometers sense the orientation of active stylus 20 in a magnetic field. Changes in orientation sensed by the magnetometer specify the motion of active stylus 20. As another example, a global positioning system (GPS) senses the location, and changes of location, of active stylus 20 relative to the Earth. These sensors produce electromagnetic signals based on the motion, force, orientation, or location sensed. Herein, electromagnetic input or signals may take any suitable form, such as an electric field, magnetic field, electromagnetic radiation, static configuration of electric charge, or electric current. While this disclosure describes specific examples of particular embodiments of gestures providing electromagnetic input to an active stylus, this disclosure contemplates any suitable method of providing any suitable input to an active stylus by any suitable gesture or combination of gestures.

Figure 6A:
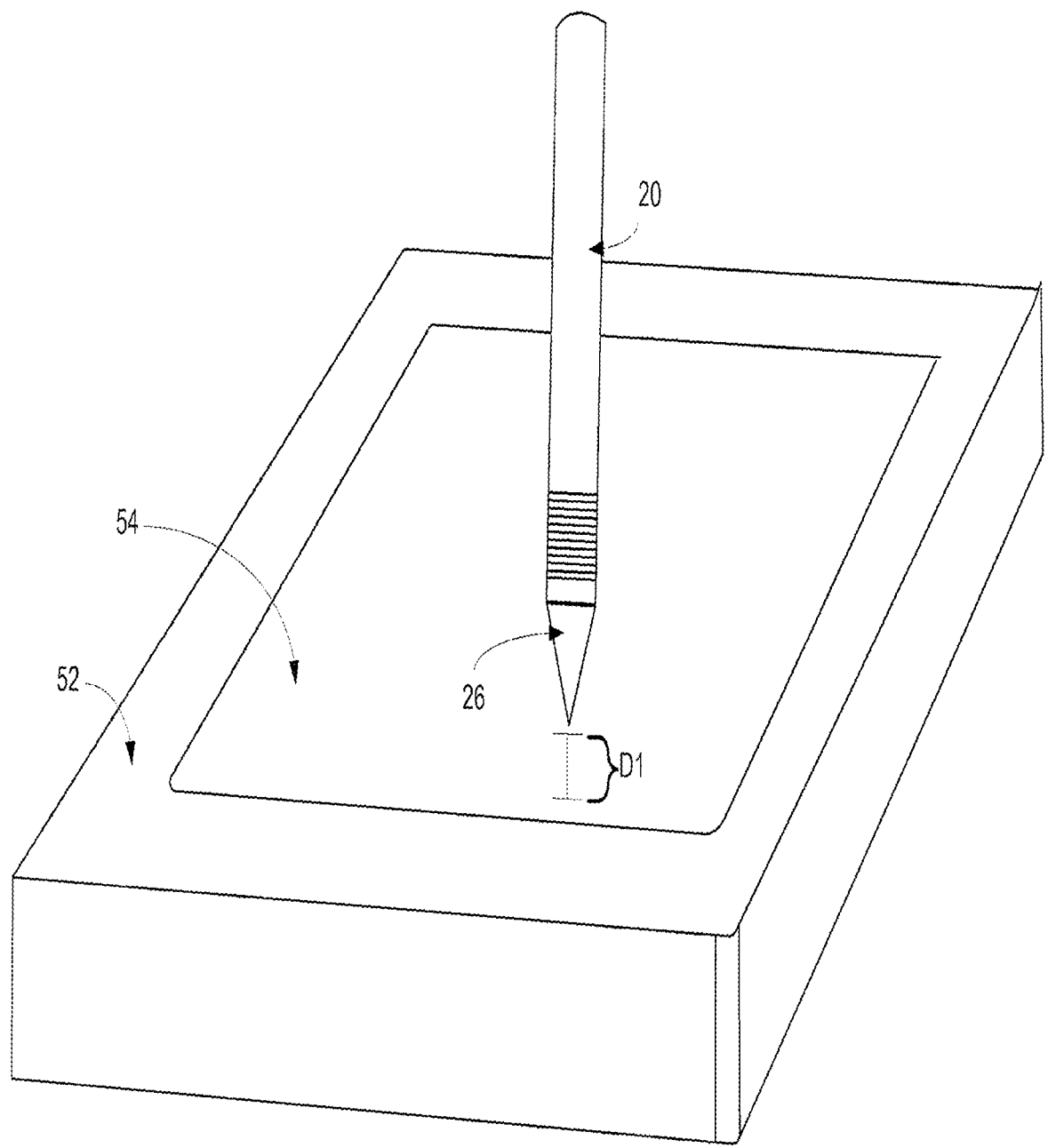
FIGS. 6A and 6B illustrate example embodiments of providing input directly to a touch-sensitive device by executing gestures with an active stylus.
Figure 6B:
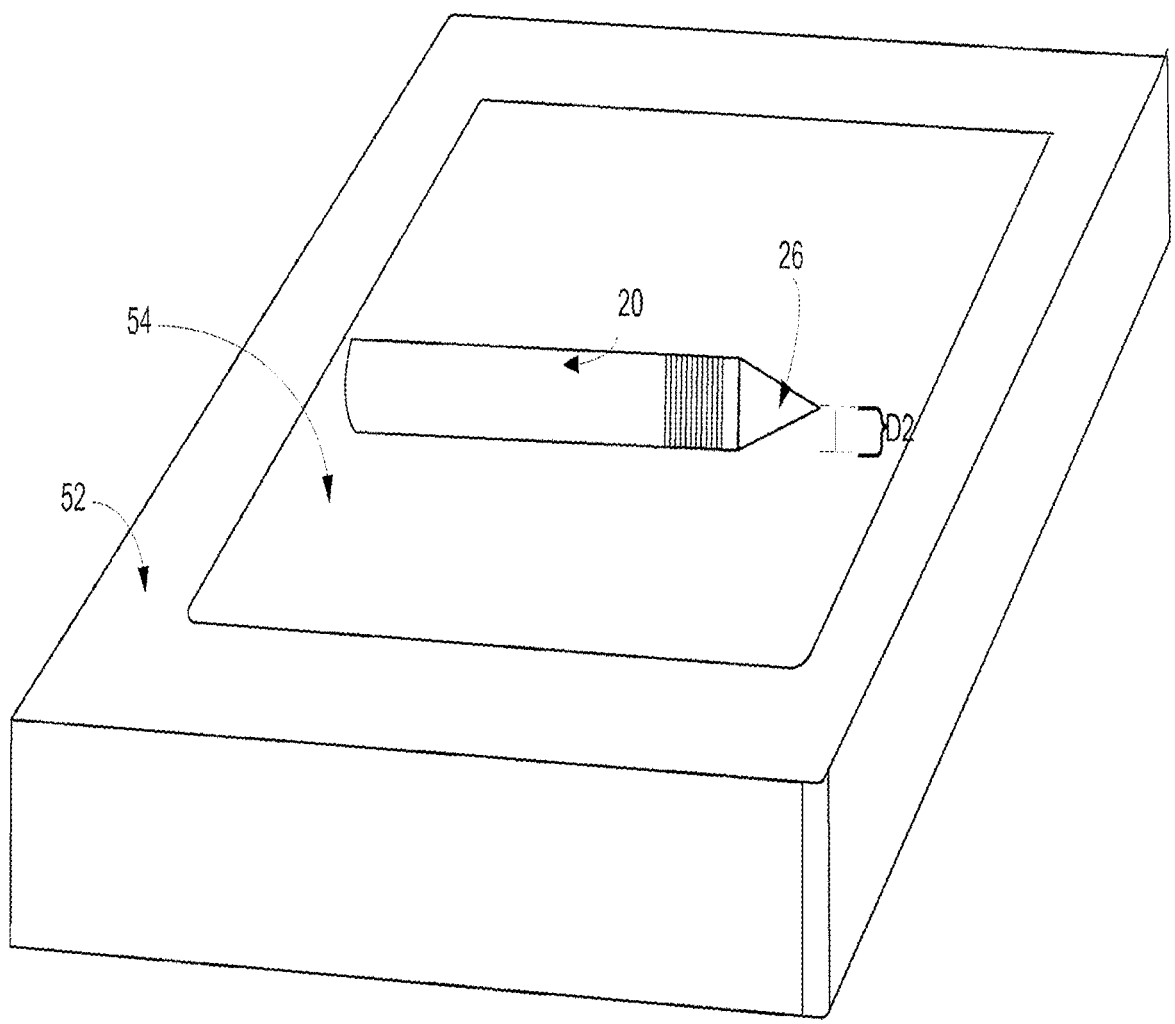

Gestures executed with or on active stylus 20 may provide electromagnetic input to a touch sensor system or associated components, such as a touch-sensitive device. In particular embodiments, electromagnetic signals produced by the components of active stylus 20 based on the motion of active stylus 20 results in active stylus 20 providing electromagnetic input to a touch-sensitive device. As an example, active stylus 20 includes a transmitter capable of transmitting electromagnetic signals, such as radio waves, to a touch-sensitive device. As another example, active stylus 20 may transmit data in, for example, electromagnetic form to a touch-sensitive device through a direct connection, such as a universal serial bus cable. In particular embodiments, gestures provide electromagnetic input directly to a touch sensor system. FIGS. 6A and 6B illustrate example embodiments of providing electromagnetic input directly to a touch-sensitive device by executing gestures with an active stylus.

In FIG. 6A, active stylus 20 is hovering over touch-sensitive display 54 of a touch-sensitive device 52, and tip 26 of active stylus 20 is separated from the touch-sensitive display by a distance D1. As an example, D1 may be approximately 10 millimeters. Electronics in touch-sensitive device 52, such as drive and sense lines, sense the location of tip 26 relative to touch-sensitive display 54, including the distance D1 separating tip 26 from touch-sensitive display 54. As an example, tip 26 outputs voltage signals that induce charge on the sense lines in the proximity of tip 26, and the induced charge depends on the distance D1. Motion of tip 26 in any direction is thus detected directly by the electronics of touch-sensitive device 52. In particular embodiments, active stylus 20 may be oriented at any suitable angle with respect to touch-sensitive display 52. As an example, FIG. 6B illustrates the body of active stylus 20 contacting touch-sensitive display 54 and tip 26 separated from touch-sensitive display 54 by a distance D2.

Figure 7:
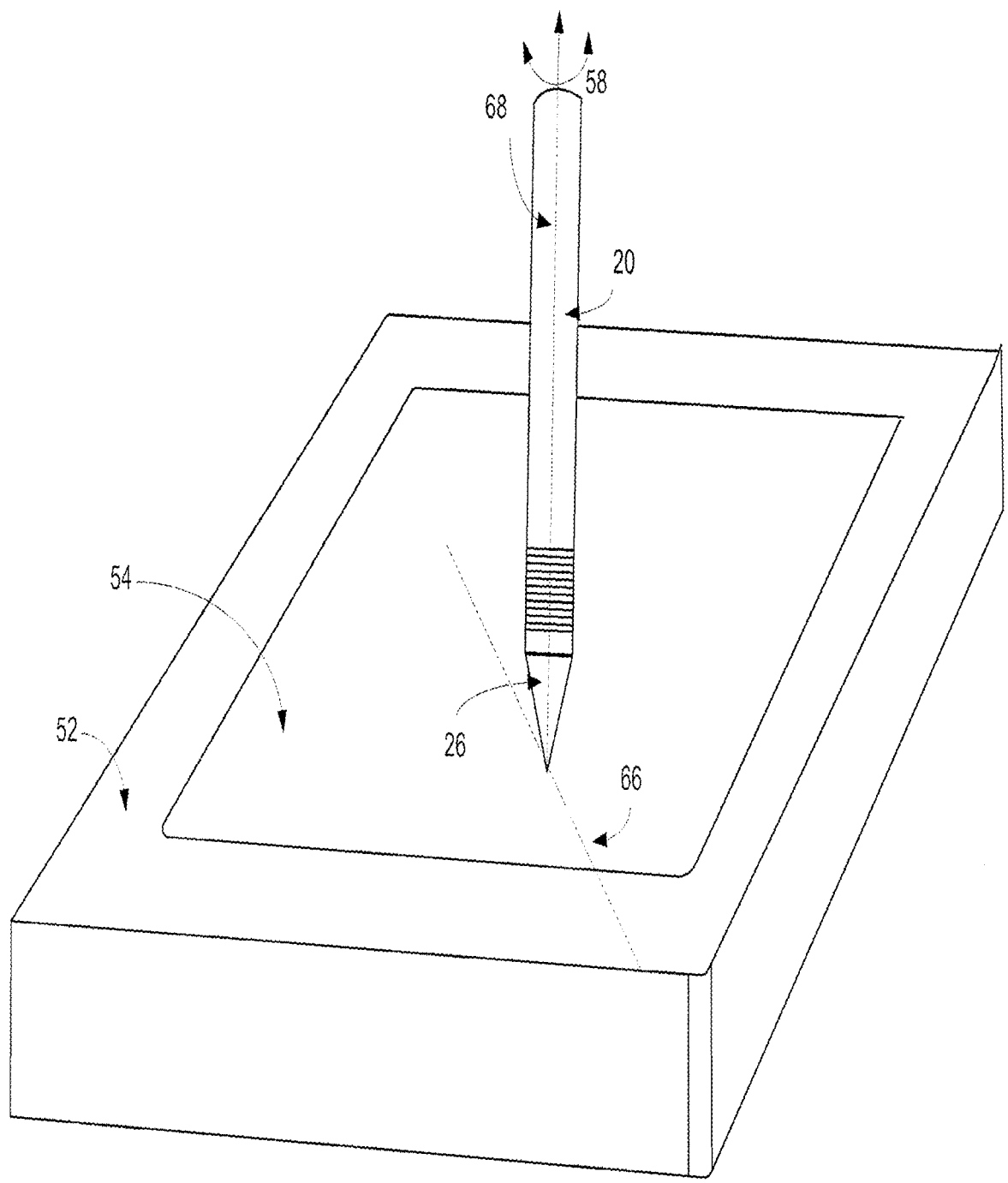
FIG. 7 illustrates an example touch-sensitive device receiving input directly from a gesture and also receiving input relating to the same or another gesture from a component of a touch-sensor system.

In particular embodiments, touch-sensitive device 52 may receive electromagnetic input directly from a gesture and also receive electromagnetic input relating to the same or another gesture from a component of a touch-sensor system, as illustrated in FIG. 7. In FIG. 7, tip 26 of active stylus 20 is in contact with touch-sensitive display 54 of touch-sensitive device 52. Motion of tip 26 is directly recorded by electronics, such as drive or sense lines, in touch-sensitive device 52. In addition, motion of active stylus 20 relative to tip 26, such as rotation 58 about axis 66 or axis 68 passing through tip 26, is recorded by one or more sensors in active stylus 20. The sensors convert the recorded motion into electromagnetic signals in active stylus 20. Active stylus 20 outputs electromagnetic signals to touch-sensitive device 52 based on the electromagnetic signals produced within the active stylus as a result of the recorded motion.

Gestures executed on or by an active stylus may result in a variety of functionality. In particular embodiments, gestures alter the functionality of, or produce functionality in, a touch sensor system or its associated components, such as an active stylus or a touch-sensitive device. In particular embodiments, the functionality associated with one or more gestures may depend on the orientation of an active stylus. As an example, shaking an active stylus in a vertical position results in different functionality than shaking an active stylus in a horizontal position. In particular embodiments, the functionality associated with one or more gestures may depend on the location of an active stylus. As an example, rotating an active stylus near a touch-sensitive device results in different functionality than rotating the active stylus when no touch-sensitive device is near. In particular embodiments, the functionality associated with one or more gestures may depend on the user associated with an active stylus or touch-sensitive device. As an example, the functionality associated with a gesture is set by a user. In particular embodiments, the functionality associated with one or more gestures may depend on data stored on an active stylus. As an example, shaking an active stylus that has encrypted data results in a different function than shaking an active stylus that has unsecured data. In particular embodiments, the functionality associated with one or more gestures may depend on the sequence of gestures. As an example, inverting an active stylus after shaking the active stylus results in a different functionality than shaking an active stylus after inverting the active stylus. In particular embodiments, an active stylus may have a tip on each end, and gestures performed with one tip near a touch-sensitive device may result in different functionality than a gesture with both tips near the touch-sensitive device. As an example, laying the active stylus flat on the touch-sensitive display so that both tips are hovering near the display provides different functionality than hovering one tip near the display.

In particular embodiments, one or more gestures may affect the functionality of an active stylus. As an example, an active stylus that creates output on a touch-sensitive display when used with the tip proximal to the display may erase output on a touch-sensitive display when used with the end opposite the tip proximal to the display. In particular embodiments, one or more gestures may alter the power settings of a touch sensor system and its associated components. As an example, shaking an active stylus transitions the active stylus or associated components from one power mode, such as "off" to another power mode, such as "on". In particular embodiments, one or more gestures may interact with output on a touch-sensitive display. As an example, encircling a group of icons with an active stylus selects the icons. Pressing the tip of the active stylus into the touch-sensitive display picks up the icons, and pressing the tip a second time onto the display drops the icons. As another example, sweeping the active stylus or tip of the active stylus across the touch-sensitive display scrolls around output on a touch-sensitive display or material related to the output. As another example, pressing the tip of an active stylus into an icon displayed on a touch-sensitive display and sweeping or flicking the tip of the active stylus can remove or delete the icon from the display. As another example, sweeping the tip of an active stylus over particular output, such as text, selects the text. As another example, pressing the tip of an active stylus into a touch-sensitive display while gesturing with the active stylus alters the typeface of characters being written on the display. In particular embodiments, one or more gestures may access specific command or menus associated with output displayed on a touch-sensitive display. As an example, selecting output of a touch-sensitive display and shaking the active stylus may display a set of commands or menus associated with the output selected or displayed. In particular embodiments, one or more gestures may combine with other functionality to perform a specific function. As an example, shaking an active stylus while pressing a button may initiate data transfer between the active stylus and a touch-sensitive device. As another example, separating either stylus with a finger or two or more fingers over output on a touch-sensitive display may zoom in on the output, and an active stylus may gesture, such as writing on the display, to interact with the zoomed-in output. As an example, performing a user's pre-defined gesture may unlock the touch-sensitive display of a touch-sensitive device. While this disclosure provides specific examples of particular embodiments of the functionality associated with one or more specific gestures, this disclosure contemplates any suitable functionality associated with any suitable gestures.

Figure 8:
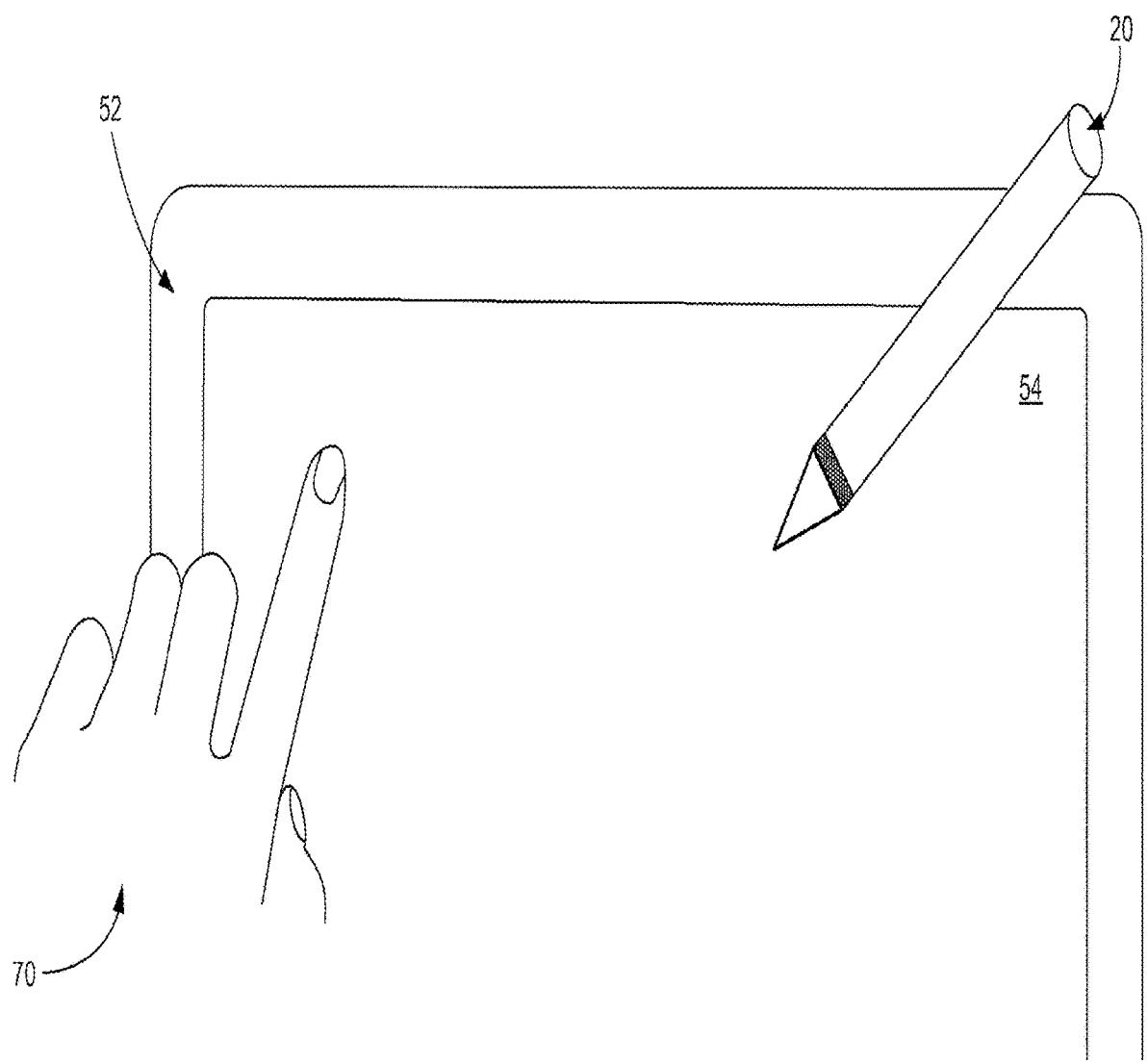
FIG. 8 illustrates an example combination input using an active stylus.

In particular embodiments, gestures may be performed by an active stylus on a touch-sensitive area of a device in combination with gestures performed by another object on the touch-sensitive area. FIG. 8 illustrates an example combination input using the example stylus of FIG. 3. In particular embodiments, a pre-determined function executed by device 52 is initiated with a combination of interactions of active stylus 20 and a portion of human hand 70 with touch-sensitive area 54 of the touch sensor of device 52. In the example of FIG. 8, the portion of human hand 70 interacting with touch-sensitive area 54 is a finger. The signal communicated to the controller of the touch sensor results from interaction of one or more fingers of human hand 70 and active stylus 20 with touch-sensitive area 54.

The controller of the touch sensor of device 52 differentiates between active stylus 20 interactions and interactions with the portion of human hand 70. As an example and not by way of limitation, the controller may differentiate an active stylus 20 interaction from a human hand 70 interaction through modulation of the touch sensor drive signal by active stylus 20. In particular embodiments, the active stylus 20 modulates the amplitude, frequency, or phase of the drive signal and the modulation of the drive signal is detected and processed by the controller as being an interaction from active stylus 20. As another example, substantially all the electrodes (i.e., drive and sense) of the touch sensor of device 52 may be sensed to detect the signal from active stylus 20 without applying a drive signal. As yet another example, the touch-sensor controller may differentiate between an active stylus 20 interaction and the human hand 70 interaction based on signal strength and "touch" area (i.e., the size of touch-sensitive area 54 detecting a touch). Interactions of active stylus 20 and human hand 70 have differing signal strength and touch area characteristics, which may be used to differentiate between the two. Although this disclosure describes particular methods of differentiating between active stylus interaction with the touch-sensitive area and human hand interaction with the touch-sensitive area, this disclosure contemplates any suitable method to differentiate between interactions of the active stylus with the touch-sensitive area and interactions of the human hand with the touch-sensitive area.

In particular embodiments, the controller of the touch sensor associates the detected combination of interaction of the portion of human hand 70 with touch-sensitive area 54 and interaction of active stylus 20 with touch-sensitive area 54 to a pre-determined function executed by device 52. Moreover, the controller may determine whether interaction of the portion of the human hand 70 with touch-sensitive area 54 forms a gesture in conjunction with the interaction of active stylus 20 or forms a gesture separate from the interaction of active stylus 20 with touch-sensitive area 54. As an example and not by way of limitation, substantially simultaneous interaction of one finger of human hand 70 and active stylus 20 with touch-sensitive area 54 may be associated with a pre-determined function. Moreover, substantially simultaneous interaction of one finger and active stylus 20 with touch-sensitive area 54 may jointly initiate the pre-determined function, such as for example zooming in, zooming out, or rotation of an object displayed on the display of device 52. As another example, interaction of two fingers of human hand 70 and active stylus 20 with touch-sensitive area 54 may be associated with two or more pre-determined functions of device 52. In particular embodiments, interactions of two fingers of human hand 70 with touch-sensitive area 54 may be used in a "spread" gesture to expand a text area displayed on the display of device 52 and interaction of active stylus 20 with touch-sensitive area 54 may be used by the user to handwrite an input in the expanded text area. Although this disclosure describes detecting and processing the combination input from the active stylus interaction with the touch-sensitive area and human hand interaction with the touch-sensitive area occurring within the controller of the touch sensor, this disclosure contemplates use of any suitable controller or combination of controllers to detect and process the combination input from the active stylus interaction with the touch-sensitive area and human hand interaction with the touch-sensitive area.

Herein, reference to a computer-readable non-transitory storage medium encompasses a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable non-transitory storage medium or a combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

The invention claimed is:

1. A stylus, comprising:
a body including an outer body having a modified surface area with at least one physical characteristic that is different from at least one physical characteristic of a remainder of the outer body;
a pen tip;
an accelerometer in the body and operable to detect a plurality of accelerations based on a plurality of touches to the modified surface area of the outer body of the body; and
a controller in the body and operable, in response to receiving a plurality of measurement signals from the accelerometer indicating that the accelerations based on the touches to the modified surface area of the outer body of the body are detected, to cause a plurality of signals to be transmitted to a device to initiate a plurality of functions to be performed by the stylus or the device,
wherein the plurality of functions respectively correspond to a plurality of gestures on the modified surface area.

2. The stylus of claim 1, wherein a first gesture of the plurality of gestures includes a movement of a first object on the modified surface area.

3. The stylus of claim 2, wherein the first object is a finger.

4. The stylus of claim 1, wherein at least one of the functions includes sending a downlink signal to a controller of the device.

5. The stylus of claim 1, wherein at least one of the functions includes authenticating a user associated with the stylus.

6. The stylus of claim 1, wherein at least one of the functions is executed by the device and is initiated with a combination of interactions of the stylus.

7. The stylus of claim 1, further comprising a gyroscope.

8. The stylus of claim 1, wherein the touches includes a user holding the body.

9. The stylus of claim 1, wherein the at least one physical characteristic is at least one of texture or temperature.

10. A method, comprising:
detecting, by an accelerometer in a stylus, a plurality of accelerations caused by a plurality of touches to a modified surface area of an outer body of a body of the stylus, wherein the modified surface area has at least one physical characteristic that is different from at least one physical characteristic of a remainder of the outer body; and
in response to receiving, by a controller in the body of the stylus, a plurality of measurement signals from the accelerometer indicating that the accelerations based on the touches to the modified surface area of the outer body of the body are detected, transmitting, by the controller in the body, a plurality of signals to a device to initiate a plurality of functions performed by the stylus or the device,
wherein the plurality of functions respectively correspond to a plurality of gestures on the modified surface area.

11. The method of claim 10, wherein a first gesture of the plurality of gestures includes a movement of a first object on the modified surface area.

12. The method of claim 11, wherein the first object is a finger.

13. The method of claim 10, wherein the at least one physical characteristic is at least one of texture or temperature.

14. A non-transitory computer-readable storage medium embodying logic that, when executed by a controller in a body of a stylus, causes the stylus to:
receive a plurality of measurement signals indicating that a plurality of accelerations is detected by an accelerometer of the stylus based on a plurality of touches to a modified surface area of a side surface of a body of the stylus that has at least one physical characteristic that is different from at least one physical characteristic of a remainder of the side surface of the body; and
initiate a plurality of functions of the stylus or a device in response to receiving the measurement signals indicating that the accelerations are detected by the accelerometer of the stylus based on the touches to the modified surface area of the side surface of the body of the stylus,
wherein the plurality of functions respectively correspond to a plurality of gestures on the modified surface area.

15. The storage medium of claim 14, wherein a first gesture of the plurality of gestures includes a movement of a first object on the modified surface area.

16. The storage medium of claim 14, wherein the at least one physical characteristic is at least one of texture or temperature.

* * * * *